(12) United States Patent
Tenny (10) Patent No.: US 6,192,227 B1
(45) Date of Patent: Feb. 20, 2001

(54) METHOD FOR DETECTING NONLINEAR DISTORTION USING MOMENT INVARIANTS

(75) Inventor: Roy Tenny, Ramat Hasharon (IL)

(73) Assignee: Conexant Systems, Inc., Newport Beach, CA (US)

(*) Notice: Under 35 U.S.C. 154(b), the term of this patent shall be extended for 0 days.

(21) Appl. No.: 09/179,637

(22) Filed: Oct. 27, 1998

(51) Int. Cl.[7] .................................................. H04B 1/00
(52) U.S. Cl. ........................ 455/295; 455/296; 375/346
(58) Field of Search ........................... 455/63, 295, 296; 375/346

(56) References Cited

U.S. PATENT DOCUMENTS 4,586,051 * 4/1986 Saito et al. ............................ 373/703
5,778,336 * 7/1998 Chou et al. ............................ 704/222

FOREIGN PATENT DOCUMENTS 62-58309 * 3/1987 (JP) ................................ G05B/23/02

OTHER PUBLICATIONS

"Fundamentals of Digital Image Processing", Anil K. Jain, 1989, Section 9.8. pp. 377–381.
Numerical Recipes in C, The Art of Scientific Computing, William H. Press et al, 1992, Chapter 14. 609–614.
TIA Standard: North American Telephone Network Transmission Model for Evaluating PCM Modem Performance PN 3857 Draft 6, Jun. 1998 pp. 52, 15.
"Nonlinear Time Series Multivariable Dynamic Processes", Ali Cinar, http://www.emsl.pnl.gov:2080/docs/incinc/dynam_sys/ACdoc.html pp. 1–13.
"Probability, Random Variables, and Stochastic Processes", Athanasios Papoulis, Third Edition McGraw–Hill, Inc pp. 109–110.
"Probability, Random Variables and Random Signal Principles" Peyton Z. Peebles, Jr., Ph.D. Third Edition, McGraw–Hill,Inc.1993 pp. 75–81.

* cited by examiner

Primary Examiner—Lee Nguyen
(74) Attorney, Agent, or Firm—Akin Gump Strauss Hauer & Feld LLP (57) ABSTRACT

A method for detecting nonlinear distortion over communication channels. The method utilizes moment invariants in determining whether nonlinear distortion exists. The method is particularly applicable to detecting the presence of nonlinear distortion over telephone lines that are used for modem communications. The detection of the presence of nonlinear distortion is important in order that appropriate processing operations be performed which are required in the presence of such distortion. The particular processing operations that are performed in the presence of nonlinear distortion function to improve the reliability of data transfer especially at higher data rates. The nonlinearity distortion is detected by calculating high order moment invariants of the error magnitude present at the input to the slicer stage in the receiver. The method of the invention is effective, in part, because the probability density function of the noise is different, i.e., has a different shape, for a channel that contains nonlinear distortion than for one that contains linear, i.e., Gaussian, distortion. In addition, the moment invariant is more sensitive to the size of the error and not necessarily the energy level of the noise.

6 Claims, 4 Drawing Sheets

METHOD FOR DETECTING NONLINEAR DISTORTION USING MOMENT INVARIANTS

FIELD OF THE INVENTION

The present invention relates generally to noise detection in communication systems and more particularly relates to a method for detecting nonlinear distortion utilizing moment invariants.

BACKGROUND OF THE INVENTION

Few people today would deny that the world is currently undergoing a communications revolution of some sorts for many years. All of the modern societies of the world today, already place heavy reliance on their communications infrastructure to support their economies, to contribute to the standard of living, to provide communications for the military, etc. Few would argue that society today would not be as advanced if it were not for the benefits derived from modern, efficient, quick and inexpensive communications that is available in many part of the world today. The current and past trend in most high technology areas is better, faster, and cheaper as time goes on and the area of communications is no exception.

Most communications systems, however, are not noise free systems. They function to transmit information from one place to another but with noise being added along the way. Today's modern digital transmission systems are less prone to external noise than the older analog systems but bit errors still occur nevertheless. Noise is especially a problem for the majority of analog lines connecting central offices to people's homes. The majority of home users and small businesses currently connect to the Internet and other on-line services via dial up modems.

Figure 1:
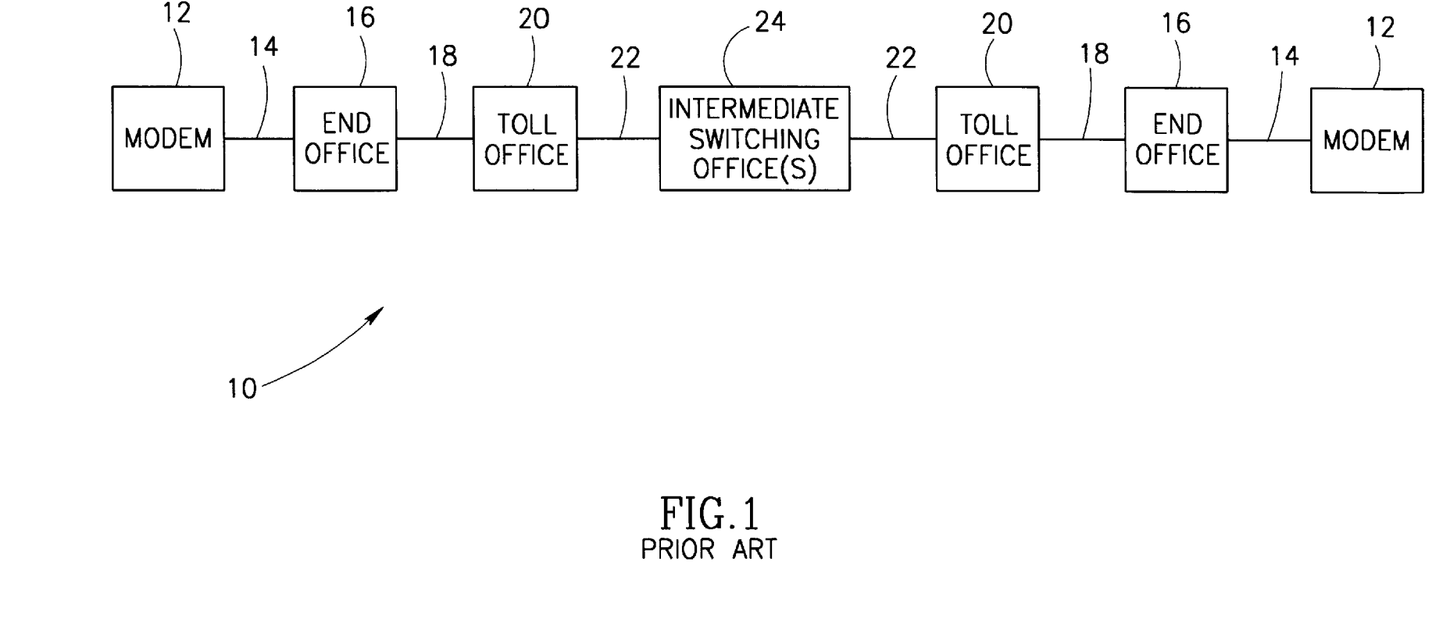
FIG. 1 is a block diagram illustrating a model of a typical channel between two modems communicating over a telephone line.

The modem signals generated are corrupted by various types of noise that is present on the telephone lines that carry and transmit the signal to the modem on the other end of the line. A block diagram illustrating a typical channel between two modems communicating over a telephone line is shown in FIG. 1. The path, generally referenced 10, of the telephone call begins at one of the modems 12 which is connected by the local loop 14 to the end or central office 16. From the central office, the call proceeds to a toll office 20 via one of many toll-connecting trunks 18. The toll office 20 is connected to an intermediate switching office 24 via one or more very high bandwidth intertoll trunks 22. The toll offices 20 may be connected via one or more intermediate switching offices 24. The path the signal takes from the other modem is similar but in the opposite direction.

Figure 2:
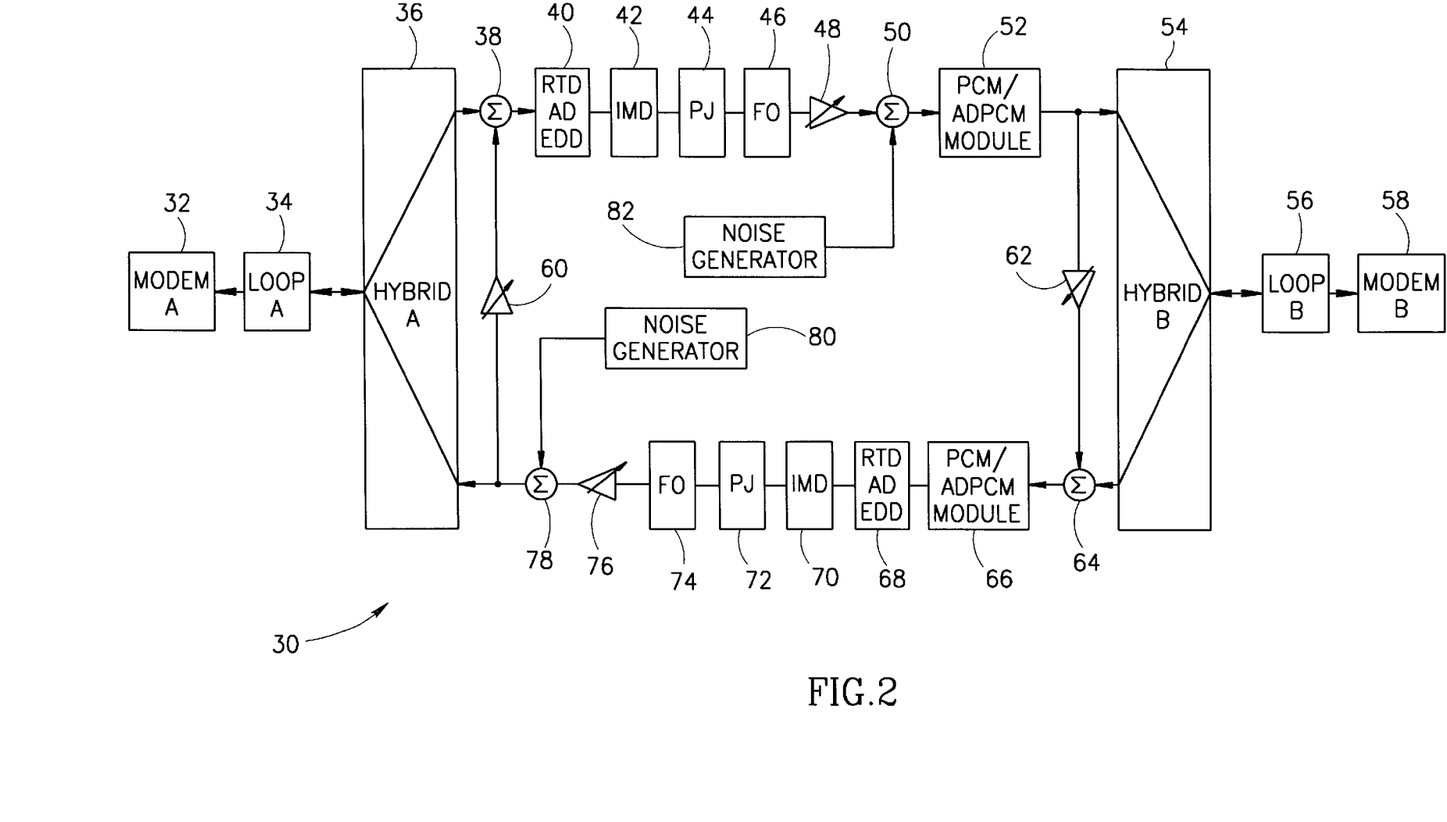
FIG. 2 is a block diagram illustrating a typical telephone channel with the various noise sources identified.

A block diagram illustrating a model of a typical telephone channel with the various noise and distortion sources highlighted is shown in FIG. 2. The channel, generally referenced 30, in one direction comprises modem A 32 connected to local loop A 34 which in turn is connected to hybrid A 36. The hybrid performs 2-wire to 4-wire conversion. The transmit signal path comprises summer 38 followed by various noise and distortion sources. The resulting signal input to the hybrid B 54 and transmitted to modem B 58 via local loop B 56.

Gaussian noise, linear and nonlinear distortion encountered along the local loops A and B. Both near and far end echoes from the channel are encountered at the hybrids. Attenuator 62 simulates the far end echo added to the receive path A via summer 64. Similarly, attenuator 60 simulates the far end echo added to the receive path B via summer 38.

Blocks 40, 68 represent round trip delay (RTD), amplitude distortion (AD) and envelope delay distortion (EDD). Blocks 42, 70 represent intermodulation distortion (IMD). Blocks 44, 72 represent phase jitter while blocks 46$m$ 74 represent frequency offset errors. In addition, attenuation of the signal is represented by attenuators 48, 76. Noise generators 82, 80 represent noise that is added to the channel via summers 50, 78 respectively.

Further, both the pulse code modulation (PCM) and adaptive differential pulse code modulation (ADPCM) blocks 52, 66 introduce both quantization noise and nonlinear noise. Note that in practice, the different types of distortion and noise described above in the typical communications channel require the applications of different algorithms and processing in order to recover the original data from the distorted noisy waveform.

The detection of nonlinear distortion in the channel is important as different signal processing is performed for this type of distortion. Techniques for detecting nonlinear distortion already exist in the prior art. Some of these techniques will now be presented.

In a linear system, the frequencies input into the system are the frequencies that are output of the system. In a nonlinear system frequencies may be output that were not present at the input. Based on this idea, one prior art method includes transmitting a rake of frequency tones wherein the rake of tones contains one or more amplitude nulls at potential intermodulation frequencies. The presence of a frequency tone at one or more of the amplitude nulls implies that nonlinear distortion potentially exists.

A second prior art method for detecting nonlinear distortion includes transmitting flat spectrum noise, i.e., white noise, having a bandstop pit that contains a low noise level. If the noise level of the pit relative to the higher non bandstop noise level is increased, it implies that nonlinear distortion potentially exists.

A third prior art method for detecting nonlinear noise is to alter the transmitted power level of the signal by a known factor. If the received level of the signal is relatively unchanged by the same factor as the transmitted signal, it implies that nonlinear distortion potentially exists. This method assumes that there is no offset, i.e., the DC offset has been filtered out.

A major disadvantage of the above described methods of detecting nonlinear distortion is that the nonlinear noise is usually not detected with sufficient probability of success and with a high probability of false alarms. This is due to the fact that other types of noise nearly always accompany the nonlinear noise. In many cases, the total power of the linear distortion due to echoes, noise, Gaussian noise and quantization noise together exceed the power of the nonlinear noise by a factor of 10 or more. In such a situation, the above described prior art methods are not effective.

SUMMARY OF THE INVENTION

The present invention is a method for detecting nonlinear distortion over communication channels. The method utilizes moment invariants in determining whether nonlinear distortion exists. The method is particularly applicable to detecting the presence of nonlinear distortion over telephone lines that are used for modem communications.

The detection of the presence of nonlinear distortion is important in order that appropriate processing operations be performed which are required in the presence of such distortion. The signal processing required in the presence of nonlinear distortion is different than that required in the presence of other types of distortion and noise. The particular processing operations that are performed in the presence of nonlinear distortion function to improve the reliability of data transfer especially at higher data rates.

The nonlinearity distortion is detected by calculating high order moment invariants of the error magnitude present at the input to the slicer stage in the receiver. The method of the invention is effective, in part, because the probability density function of the noise is different, i.e., has a different shape, for a channel that contains nonlinear distortion than for one that contains linear, i.e., Gaussian, distortion. In addition, the moment invariant is more sensitive to the size of the error and not necessarily the energy level of the noise.

There is provided in accordance with the present invention, in a communications system having a channel and a receiver coupled to the channel, a method of detecting the presence of nonlinear distortion, the method comprising the steps of generating an error signal, calculating a moment invariant utilizing the error signal and declaring the existence of nonlinear distortion when the moment invariant exceeds a predetermined threshold.

The step of calculating the moment invariant is performed utilizing the following equation $$MI = \frac{\sum_{i=n_1}^{n_2} (E_i)^{2p}}{\left(\sum_{k=n_1}^{n_2} (E_k)^2\right)^p}$$

where

MI is the moment invariant that is a number used to detect nonlinear distortion, $E_i$ are the error samples at times $i=n_1$ to $n_2$, $E_k$ are the error samples at times $k=n_1$ to $n_2$, $n_1$ to $n_2$ are the start and end times of the sampled error, p is the power of the moment.

There is also provided in accordance with the present invention, in a communications system having a channel and a receiver coupled to the channel, the receiver comprising a plurality of processing stages including a slicer, a method of detecting the presence of nonlinear distortion, the method comprising the steps of generating an error signal from the difference between the slicer input and the slicer output, calculating a moment invariant utilizing the error signal and declaring the existence of nonlinear distortion when the moment invariant exceeds a predetermined threshold.

In addition, there is provided in accordance with the present invention a communications receiver for detecting the presence of nonlinear distortion in a received signal, the receiver coupled to a communications channel comprising first filter means for filtering the signal received from the channel, conversion means for converting the analog signal output of the first filter means to a plurality of digital samples, echo canceler means for reducing the level of echo noise in the signal, a demodulator for demodulating voice band frequencies to baseband frequencies, second filter means for filtering the output of the demodulator, an equalizer operative to decrease the linear amplitude envelope and phase distortion of the signal, a slicer operative to generate data output in response to the output of the equalizer, a summer for generating an error signal from the difference between the slicer input and the slicer output and nonlinearity detection means operative to detect the existence of nonlinear distortion in response to the error signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AD | Amplitude Distortion |
| ADPCM | Adaptive Differential Pulse Code Modulation |
| AGC | Automatic Gain Control |
| BER | Bit Error Rate |
| DC | Direct Current |
| EDD | Envelope Delay Distortion |
| IMD | Intermodulation Distortion |
| LPF | Low Pass Filter |
| MI | Moment Invariant |
| PCM | Pulse Code Modulation |
| PDF | Probability Density Function |
| RTD | Round Trip Delay |
| TIA | Telecommunications Industry Association |

General Description

The present invention is a method for detecting nonlinear distortion over communication channels. The method utilizes moment invariants in determining whether nonlinear distortion exists. The method is particularly applicable to detecting the presence of nonlinear distortion over telephone lines that are used for modem communications. In general, the method is invention is applicable in any modem wherein it is desirable to detect the presence of nonlinear distortion.

Nonlinear distortion can be modeled mathematically. Following are a series of equations that model the input and output of both linear and nonlinear systems for continuous/discrete (sampled) systems and systems with/without memory. The following definitions apply.

x(t) represents the continuous time input to a system;

y(t) represents the continuous time output from a system;

x(n) represents the discrete time input to a system;

y(n) represents the discrete output from a system;

For a linear, continuous time system without memory, $$y(t)=a_0+a_1 x(t) \qquad (1)$$

For a nonlinear, continuous time system without memory, $$y(t)=a_0+a_1 x(t)+a_2 x^2(t)+ \qquad (2)$$

For a linear, discrete time system without memory, $$y(n)=a_0+a_1 x(n) \qquad (3)$$

For a nonlinear, discrete time system without memory, $$y(n) = a_0 + a_1 x(n) + a_2 x^2(n) + \quad (4)$$

For a linear, continuous time system with memory, $$y(t) = h_0 + \int_{-\infty}^{\infty} h_1(\tau) x(t-\tau) d\tau \quad (5)$$

For a nonlinear, continuous time system without memory, $$y(t) = h_0 + \int_{-\infty}^{\infty} h_1(\tau) x(t-\tau) d\tau + \quad (6)$$
$$\int_{-\infty}^{\infty} \int_{-\infty}^{\infty} h(\tau_1, \tau_2) x(t-\tau_1) x(t-\tau_2) d\tau_1 d\tau_2 +$$
$$\int_{-\infty}^{\infty} \int_{-\infty}^{\infty} \int_{-\infty}^{\infty} h_3(\tau_1, \tau_2, \tau_3) x(t-\tau_1) x(t-\tau_2) x(t-\tau_3) d\tau_1 d\tau_2 d\tau_3 +$$
$$\ldots$$

For a linear, discrete time system with memory, $$y(n) = h^{(0)} + \left[ \sum_i h_i^{(1)} x(n-i) \right] \quad (7)$$

For a nonlinear, discrete time system with memory, $$y(n) = h^{(0)} + \left[ \sum_i h_i^{(1)} x(n-i) \right] + \left[ \sum_i \sum_j h_{ij}^{(2)} x(n-i) x(n-j) \right] + \quad (8)$$
$$\left[ \sum_i \sum_j \sum_k h_{ijk}^{(3)} x(n-i) x(n-j) x(n-k) \right]$$

To aid in illustrating the principles of the present invention, the method of the invention is presented in the context of a communications modem. Note, however, that one skilled in the signal processing and communications arts can apply the method of the invention to numerous other applications as well.

Figure 3:
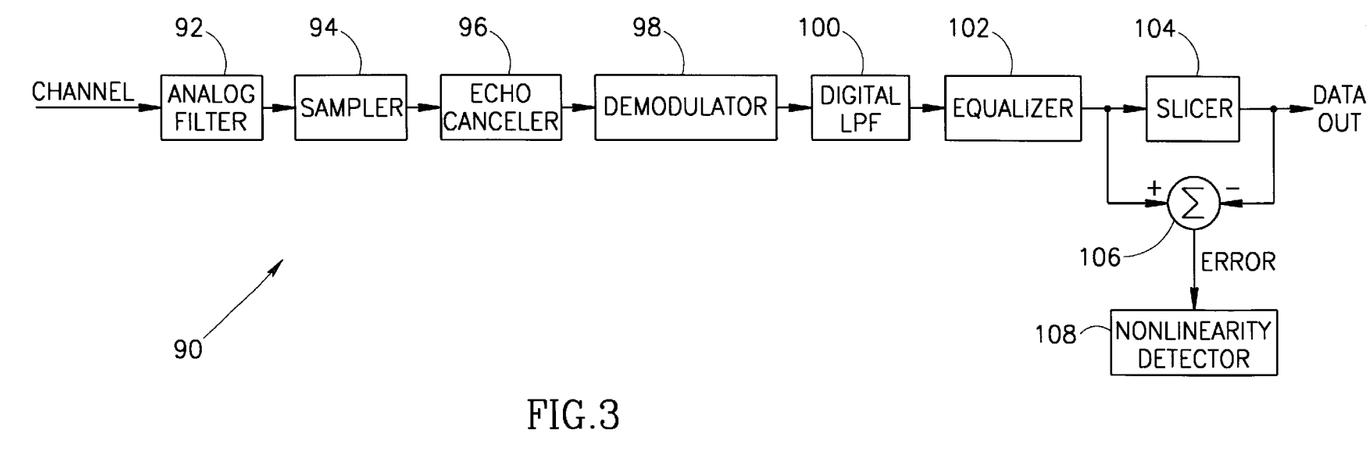
FIG. 3 is a block diagram illustrating an example communications receiver incorporating the nonlinear noise detector of the present invention.

A block diagram illustrating an example communications modem incorporating the nonlinear noise detector of the present invention is shown in FIG. 3. The noisy, distorted signal from the channel, i.e., telephone line, enters the front end of the modem and is filtered by the analog filter 92 which functions to reduce the high frequency noise present in the signal. This analog filtering stage is required in order to avoid aliasing of the high frequency noise components to lower frequencies during the sampling operation.

The output of the analog filter 92 is input to a sampler 94 that functions to convert the analog signal to a stream of digital samples. The output of the sampler 94 is input to an echo canceler 96 that functions to reduce the amount of echo noise in the signal. The echo noise being made up of both near and far end echo noise. The output of the echo canceler is input to the demodulator 98 that functions to demodulate the signal from voice band frequencies to baseband frequencies.

The demodulated signal is input to a digital low pass filter (LPF) 100 that functions to further reduce the noise in the signal. The signal is then input to an equalizer 102 that functions to reduce the linear amplitude envelope and phase distortion of the signal. The output of the equalizer 102 is input to the slicer 104 that functions to determine the original transmitted data.

If it is assumed that the slicer outputs correct data, then the difference between the signal input to the slicer and the signal output from the slicer represents the error present at the input to the slicer. This error signal, as generated by the summer 106 is input to the nonlinearity detector 108. The error signal input to the nonlinearity detector comprises the noise components remaining after the major noise components have been reduced by the previous signal processing stages. The major noise components including, buy not limited to echo noise, Gaussian noise, phase jitter and amplitude envelope linear distortion.

The nonlinearity distortion is detected by calculating high order moment invariants of the error magnitude present at the input to the slicer. Note that moment invariants are quantities well in the mathematical arts and are used for various purposes such as data classification, probability density function (PDF) classification and image processing. Moment invariants are particularly useful, for example, in shape or pattern recognition where it is desirable that geometric transformations such as translation, scaling and offset not effect the recognition of image shapes. See, for example, Fundamentals of Digital Image Processing, Anil K. Jain, 1989, Section 9.8. They are also useful in the classification of probability density functions. A more detailed discussion of moment invariants can be found in Numerical Recipes in C, The Art of Scientific Computing, William H. Press et al, 1992, Chapter 14, incorporated herein by reference.

An example of a moment invariant that can be used to detect nonlinearity distortion is shown below in Equation 9.

$$MI = \frac{\sum_{i=n_1}^{n_2} (E_i)^{2p}}{\left( \sum_{k=n_1}^{n_2} (E_k)^2 \right)^p} \quad (9)$$

where

MI is the moment invariant that is a number used to detect nonlinear distortion;

$E_i$ are the error samples at times i=$n_1$ to $n_2$;

$E_k$ are the error samples at times k=$n_1$ to $n_2$;

$n_1$ to $n_2$ are the start and end times of the sampled error;

p is the power of the moment;

Nonlinear distortion is determined to exist whenever MI exceeds a specified threshold value. Note that higher values for p cause greater weight to be given to larger errors. In other words, higher values of p cause the difference between weights given to large errors to increase compared to weights given to smaller error numbers.

The method of the invention is effective, in part, because the probability density function of the noise is different, i.e., has a different shape, for a channel that contains nonlinear distortion than for one that contains linear, i.e., Gaussian, distortion. Different types of noise may yield different clusters of moment invariant values.

It is important to note that the moment invariant is invariant, i.e., insensitive, to scaling of the noise. If the error is scaled upwards or downwards, the moment invariant is not effected since the scaling of the error can be factored out of both the numerator and the denominator and thus cancel out. The numerator of Equation 9 is highly effected, however, by large numbers of high valued errors as is demonstrated in the example presented infra. This is because the error is raised to the 2p power and them summed. The denominator is less so effected since the error is squared, summed and then raised to the p power. Therefore, higher values of p function to give substantially more weight to larger numbers of high valued errors. Low values of p give more of an equal weight to both high and low valued errors.

To detect nonlinearity distortion, it is preferable to use a higher value of p, such as 4. The high power of p gives much higher weight to error values located further out on the tail of the PDF curve. Those errors located at the edge of the PDF curve characterize the distribution of the nonlinear noise desired to be detected. A high p value is necessary in order to detect this type of error.

In addition, the moment is more sensitive to large errors and not necessarily the energy level of the noise. The moment shown in Equation 9 is invariant to linear magnification (scaling) of the error, i.e., multiplication of the error by a constant. Thus, the calculation of the moment is invariant to linear changes in the amplitude of the noise. The same result would be achieved if the noise, for example, were doubled.

The method of detecting nonlinear distortion utilizing moment invariants has several advantages. Firstly, the method utilizes an error quantity that is generated at the input to the slicer in the receiver portion of the modem. This error quantity has already been corrected and compensated for the various noise and distortion sources. For example, echo noise was removed by the echo canceler, linear distortions in the channel compensated for by the equalizer and colored additive noise reduced by the matched filter and equalizer. It is preferable to utilize an error signal that has already been processed by the various signal processing blocks in the receiver as input to the nonlinearity distortion detector since the error signal contains far less noise and distortion from sources other then those generating nonlinear distortion. For example, the distortion can be detected after the signal is processed by the receiver stages up to the slicer.

Secondly, in a communication system that contains a slicer such as a receiver in a modem, the probability of error is influenced by relatively large errors. In other words, the tail of the probability density function of the error relative to it main bell portion has a much greater influence on the probability of error. The higher moments, e.g., $8^{th}$ order, give higher weight to the high valued errors and thus are a characteristic of the error directly causing the slicer to generate incorrect data.

A third advantage is that during the operation of the receiver the nonlinear distortion noise passes through and effects various stages of the receiver, e.g., automatic gain control (AGC), equalizer, adaptation mechanisms, etc., and its final influence on the bit error rate (BER) of the receiver may be very complex. The positioning of the nonlinear distortion detector at the input of the slicer permits the detector to be sensitive to any effect the nonlinear distortion has on the previous processing stages of the receiver. For example, the nonlinear distortion may have a bigger effect on the data output when it influences the adaptation mechanisms and therefore, the positioning of the detector at the input to the slicer makes the detector more sensitive to the nonlinear distortion.

Further, the method is relatively straightforward to implement as compared to the prior art method described hereinabove. While the prior art methods require use of a special handshaking phase between two modems whereby a rake of tones is transmitted or the signal amplitude is altered, the method of the present invention does not require another handshake phase and is able to operate during normal operation of the modem, including training and/or data transmission phases. In addition, the method of the invention is relatively easy to implement since it utilizes an error signal that the receiver normally computes in any case.

The method of the present invention also requires much less computation resources than the prior art methods. While the prior art methods require filters or Fourrier transforms to perform frequency analysis, the calculation of the moment invariant requires a relatively small amount of computation resources.

Figure 4A:
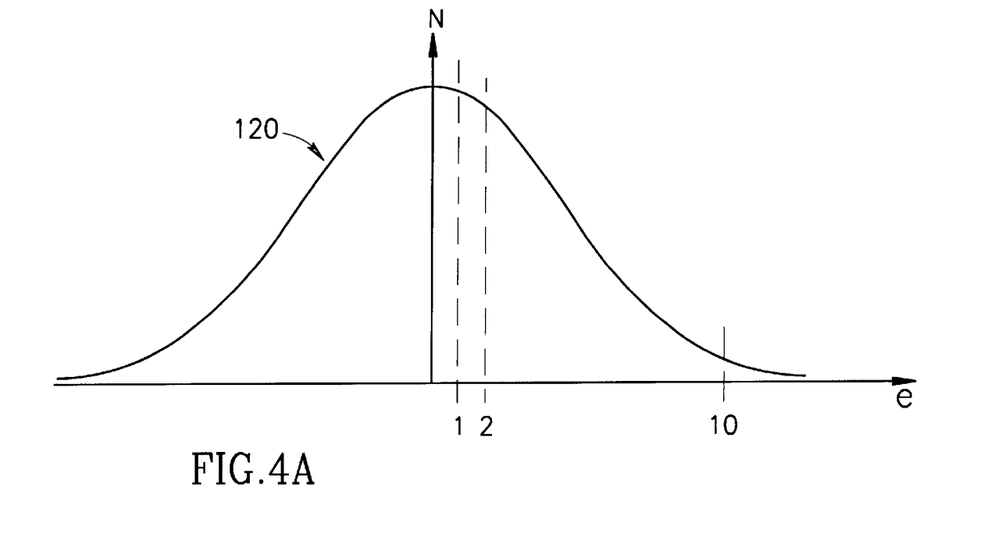
FIG. 4A is an example PDF of the linear noise component of a signal.
Figure 4B:
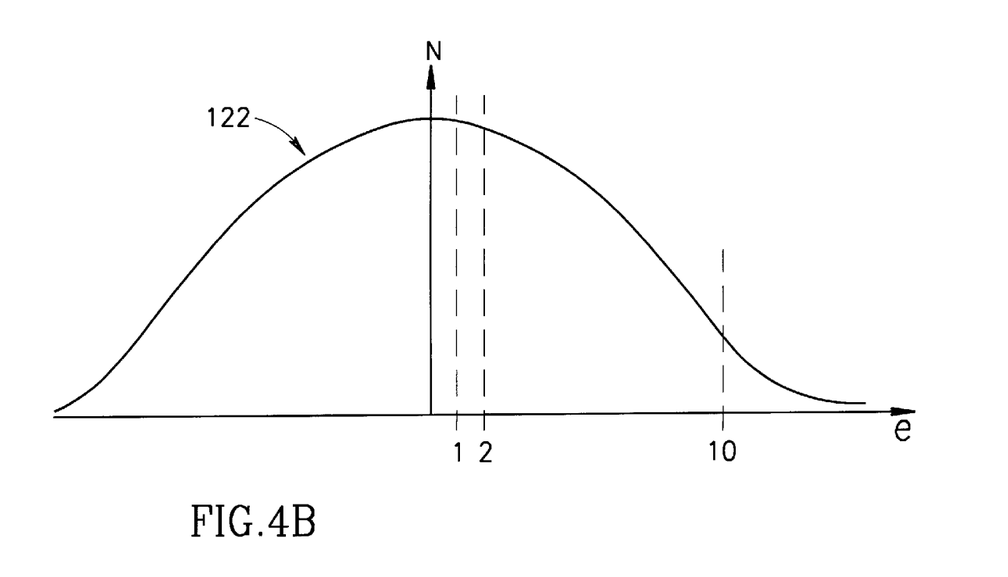
FIG. 4B is an example PDF of the nonlinear noise component of a signal.

An illustrative example will now be presented. An example PDF of the linear and nonlinear noise component of a signal is shown in FIGS. 4A, 4B, respectively. The curve 120 representing the linear PDF presents the number of errors on the y-axis versus the magnitude of the error on the x-axis, likewise for the curve 122 representing the nonlinear PDF. Note that the nonlinear PDF has a fatter tail, i.e., a higher number of larger errors. This is a key characteristic of nonlinear noise. Using a moment invariant of a relatively high order, such as 8 (p=4), permits this difference (higher tail content) to be detected by the method of the invention.

Example data for both curves and the values of the error at versus powers are presented below in Table 1.

TABLE 1

| N (Linear) | N (Nonlinear) | Error | (Error)$^1$ | (Error)$^2$ | (Error)$^8$ |
|---|---|---|---|---|---|
| 1000 | 998 | 1 | 1 | 1 | 1 |
| 500 | 500 | 2 | 2 | 4 | 256 |
| 1 | 3 | 10 | 10 | 100 | 100,000,000 |

The values in the first two columns of Table 1 indicate the number N of errors having a value 1, 2, 10. The error corresponding to the number N is listed in the third column. The first, second and eighth powers of the error are also shown. Note that the large percentage difference between the linear and nonlinear PDF at large error values, i.e., 1 versus 3, becomes dramatic when the error is taken to a high power (the eighth power) as compared to lower powers, i.e., one or two.

Thus, as described above, higher values for p cause greater weight to be given to larger errors. In other words, higher values of p cause the difference between weights given to large errors to increase compared to weights given to smaller error numbers. The high power of p gives much higher weight to error values located further out on the tail of the PDF curve.

With reference to the above example with p=4 and using Equation 9, the moment invariant MI for the linear noise is calculated below in Equation 10.

$$MI = \frac{\frac{1000 \cdot 1^8 + 500 \cdot 2^8 + 1 \cdot 10^8}{1000 + 500 + 1}}{\left(\frac{1000 \cdot 1^2 + 500 \cdot 2^2 + 1 \cdot 10^2}{1000 + 500 + 1}\right)^4} = 3666.5 \quad (10)$$

The moment invariant MI for the nonlinear noise can be calculated as shown below using Equation 11.

$$MI = \frac{\frac{998 \cdot 1^8 + 500 \cdot 2^8 + 3 \cdot 10^8}{998 + 500 + 3}}{\left(\frac{998 \cdot 1^2 + 500 \cdot 2^2 + 3 \cdot 10^2}{998 + 500 + 3}\right)^4} = 8579.2 \quad (11)$$

The moment invariant for the nonlinear case is approximately 2.5 times larger. This is mainly due to the difference between the number of errors of size 10, i.e., 1 versus 3. This is a large percentage difference that is amplified by the moment invariant. It is important to note that the scaling of the noise to both sets of numbers does not effect the numbers shown above. The linear noise functions to multiply the existing error numbers. This noise gets factored out and does effect the results.

An additional example is presented below whereby a telephone line simulator was used to simulate various types and levels of channel impairments. The simulation of the line was in accordance with the TIA standard: North American Telephone Network Transmission Model for Evaluating PCM Modem Performance PN 3857 Draft 6, June 1998. Local loop models 1, 3, 4, 5 and 6 for the 1A and 1D network impairment models were used in the simulation. The moment invariant measured for each model is shown below in Table 2.

TABLE 2

| Model Type | Moment Invariant |
|---|---|
| 1A-1 | 2427.9 |
| 1A-3 | 1978.1 |
| 1A-4 | 2224.3 |
| 1A-5 | 2549.8 |
| 1A-6 | 542.8 |
| 1D-1 | 22.8 |
| 1D-3 | 28.2 |
| 1D-4 | 22.1 |
| 1D-5 | 24.0 |
| 1D-6 | 26.5 |

In accordance with the standard, the 1A type model contains much higher levels of second and third order intermodulation distortion (IMD) then the 1D type model. IMD distortion is the principle source of nonlinear distortion. The MI as calculated by Equation 9 above, operates to effectively distinguish between the two types of models thus enabling the existence of nonlinear noise to be detected.

While the invention has been described with respect to a limited number of embodiments, it will be appreciated that many variations, modifications and other applications of the invention may be made.

What is claimed is:

1. In a communications system having a channel and a receiver coupled to said channel, a method of detecting the presence of nonlinear distortion, said method comprising the steps of:

generating an error signal;

calculating a moment invariant utilizing said error signal; and declaring the existence of nonlinear distortion when said moment invariant exceeds a predetermined threshold.

2. The method according to claim 1, wherein said step of calculating said moment invariant is performed utilizing the following equation $$MI = \frac{\sum_{i=n_1}^{n_2} (E_i)^{2p}}{\left(\sum_{k=n_1}^{n_2} (E_k)^2\right)^p}$$

where

MI is the moment invariant that is a number used to detect nonlinear distortion;

$E_i$ are the error samples at times $i=n_1$ to $n_2$;

$E_k$ are the error samples at times $k=n_1$ to $n_2$;

$n_1$ to $n_2$ are the start and end times of the sampled error;

p is the power of the moment.

3. In a communications system having a channel and a receiver coupled to said channel, said receiver comprising a plurality of processing stages including a slicer, a method of detecting the presence of nonlinear distortion, said method comprising the steps of:

generating an error signal from the difference between the slicer input and the slicer output;

calculating a moment invariant utilizing said error signal; and declaring the existence of nonlinear distortion when said moment invariant exceeds a predetermined threshold.

4. The method according to claim 3, wherein said step of calculating said moment invariant is performed utilizing the following equation $$MI = \frac{\sum_{i=n_1}^{n_2} (E_i)^{2p}}{\left(\sum_{k=n_1}^{n_2} (E_k)^2\right)^p}$$

where

MI is the moment invariant that is a number used to detect nonlinear distortion;

$E_i$ are the error samples at times $i=n_1$ to $n_2$;

$E_k$ are the error samples at times $k=n_1$ to $n_2$;

$n_1$ to $n_2$ are the start and end times of the sampled error;

p is the power of the moment.

5. A communications receiver for detecting the presence of nonlinear distortion in a received signal, said receiver coupled to a communications channel, comprising:

first filter means for filtering said signal received from said channel;

conversion means for converting the analog signal output of said first filter means to a plurality of digital samples;

echo canceler means for reducing the level of echo noise in said signal;

a demodulator for demodulating voice band frequencies to baseband frequencies;

second filter means for filtering the output of said demodulator;

an equalizer operative to decrease the linear amplitude envelope and phase distortion of said signal;

a slicer operative to generate data output in response to the output of said equalizer;

a summer for generating an error signal from the difference between the slicer input and the slicer output; and nonlinearity detection means operative to detect the existence of nonlinear distortion in response to said error signal.

6. The receiver according to claim 5, wherein said nonlinearity detection means comprises calculating a moment invariant utilizing the following equation $$MI = \frac{\sum_{i=n_1}^{n_2} (E_i)^{2p}}{\left(\sum_{k=n_1}^{n_2} (E_k)^2\right)^p}$$

where

MI is the moment invariant that is a number used to detect nonlinear distortion;

$E_i$ are the error samples at times $i=n_1$ to $n_2$;

$E_k$ are the error samples at times $k=n_1$ to $n_2$;

$n_1$ to $n_2$ are the start and end times of the sampled error;

p is the power of the moment.

* * * * *